United States Patent [19]

Pourahmady

[11] Patent Number: 5,292,823
[45] Date of Patent: Mar. 8, 1994

[54] THERMALLY STABLE POLYVINYL CHLORIDE RESIN

[75] Inventor: Naser Pourahmady, Avon Lake, Ohio

[73] Assignee: The Geon Company, Independence, Ohio

[21] Appl. No.: 919,638

[22] Filed: Jul. 24, 1992

Related U.S. Application Data

[63] Continuation of Ser. No. 692,983, May 3, 1991, abandoned, which is a continuation-in-part of Ser. No. 522,280, May 11, 1990, abandoned.

[51] Int. Cl.$^5$ .................................. C08F 8/26
[52] U.S. Cl. ........................... 525/331.5; 525/337
[58] Field of Search ............................ 525/331.5

[56] References Cited

U.S. PATENT DOCUMENTS

| | | | |
|---|---|---|---|
| 3,454,623 | 7/1969 | Graham | 525/337 |
| 3,875,131 | 4/1975 | Lim | 525/344.1 |
| 4,085,267 | 4/1978 | Morningstar | 526/74 |
| 4,360,623 | 11/1982 | Wade | 524/404 |

FOREIGN PATENT DOCUMENTS 7515060 6/1976 Netherlands .

Primary Examiner—Christopher Henderson
Attorney, Agent, or Firm—Miles B. Dearth

[57] ABSTRACT

Polyvinyl halide resin absent allylic halogen is disclosed. Another polyvinyl halide resin absent allylic halogen, allylic branching and unsaturation is also disclosed. The compositions of this invention are prepared by contacting any polyvinyl halide resin with a hydrogen-substituting compound that has a selective affinity for the allylic halogens.

1 Claim, 4 Drawing Sheets

THERMALLY STABLE POLYVINYL CHLORIDE RESIN

This is a continuation of Ser. No. 07/692,983 filed May 3, 1991, now abandoned, which is a continuation-in-part of application Ser. No. 07/522,280 filed May 11, 1990 now abandoned.

BACKGROUND OF THE INVENTION

This invention relates to thermally stable polyvinyl halide resins. Specifically, this invention relates to polyvinyl halide resins for example polyvinyl chloride that is free of allylic chlorine and has superior heat stability than has heretofore been disclosed.

Polyvinyl halide resins are used in a variety of applications. These thermoplastic polymers can be fabricated into useful articles by extrusion, injection molding, compression molding and other thermoforming methods. Generally these methods involve mixing the resin with processing aids, heating the composition to a temperature to fuse the resin particles, forming the composition into the desired shape, and then cooling the composition to a solid. Due to the presence of unsaturation and labile allylic halogen in the polymer backbone, the resin is sensitive to dehydrohalogenation when exposed to heat. In particular, polyvinyl chloride resins are so sensitive to heat, they do not exhibit a distinct melting point and must be combined with fusing agents to facilitate their fusing during forming. At the melt temperatures, the polymer degrades and turns black. The polymer degrades because the allylic chlorines are activated when exposed to heat and are released from the polymeric backbone. A free radical remains that reacts with another part of the backbone causing crosslinking, or propagation of double bonds. Also, free chlorines react together to form $Cl_2$ or with released hydrogen to form HCl. Although polyvinyl chloride resins are initially white, thermoformed articles that are damaged by heat during the process can range in color from yellow to black.

To stabilize polyvinyl halide resins during thermoforming methods, heat or thermal stabilizers are added to the resins. By using these stabilizers, the resin can be fused with a reduced degree of degradation and discoloration. Examples of such heat stabilizers are organometallic compounds such as metallic, alkali metal and alkaline earth metal salts of fatty acids. The metals include lead, barium, cadmium, tin, calcium, and zinc. A popular organometallic stabilizer is dibutyltin di-2-ethylhexanoate. It is believed that the stabilizers function by reacting with the labile allylic chlorines. The chlorine complexes with the metal and the organic group substitutes for the chlorine on the backbone.

Unfortunately, the stabilizers provide only relatively short-term stability. The organic group can be further eliminated when heated by the same mechanism as the chlorine is eliminated as in PVC. Moreover, the stabilizers can be hazardous to the environment or even toxic, can themselves discolor the resin, and can also be incompatible with the resins. Since the metal remains mixed with the resin as a metal chloride complex, it can leach out of, or migrate from the resin or formed article. This can cause cracking in the molded article as well as cause damage to other articles that are in contact with the resin-formed article. Also, in stabilized PVC this residual metal chloride can contribute to degradation of the polymer at high processing temperatures. The metal chloride complex contributes to crosslinking and viscosity increase of the polymer at high temperatures. This viscosity increase is observed when the compound is processed at 200° C. for about 25 minutes. The amount of torque required to process the compound increases dramatically as the viscosity increases. Thus, processing costs are increased. Furthermore, the substitution of the organo group on the backbone alters the structure of the polyvinyl chloride resin and can affect its properties. Thus, although the stabilizers are effective in a certain range of temperatures for stabilizing polyvinyl chloride resins during thermoforming processing, they have disadvantages that discourage their use.

Conventional alkyl tin stabilizer additives known to displace allylic chlorines substitute therefore alkyl groups at the allylic carbon. This treatment can be carried out by treating the resin with a stabilizing treatment solution. In this method, the resin is dissolved in a solvent, and the treatment solution is then added. The resin is then precipitated from the solution and recovered. Examples of treatment solutions are potassium allyl xanthate in dimethyl formamide, di(n-butyl)tin bis (n-dodecyl mercaptide) or mixtures with di(butyl)tin dichloride in o-dichloro-benzene, and dialkylaluminum chloride with a lower alkanol. Again, these compounds substitute the labile allylic chlorines and introduce a foreign structure onto the backbone other than hydrogen. For example, in the dialkylaluminum chloride and lower alkanol treatment, the dialkylaluminum chloride is sued to catalyze the substitution of the organic portion of the alkanol to the polymer backbone. Thus, the organic portion is attached to the backbone through an ether-linkage. This results in what is known as allylic branching. This allylic branching is nevertheless a more labile site as compared to the —$CH_2$— structure absent an alkyl branch.

Therefore, considering the many uses of polyvinyl halide articles, resins that have superior heat stability are desired. Also, in view of the disadvantages associated with the use of stabilizers and organic treatments, it would be desirable to produce a vinyl halide polymer, for example a vinyl chloride polymer which is absent allylic chlorine and allylic branching as analyzed by the precise $^1H$ proton Nuclear magnetic resonance spectroscopic method. Furthermore, it would also be highly desirable to provide a vinyl chloride polymer absent allylic chlorine, allylic branching and unsaturation.

SUMMARY OF THE INVENTION

This invention is a polyvinyl halide resin that is free of allylic halogen and allylic branching. In another embodiment this invention is a polyvinyl halide resin that is free of allylic halogen, allylic branching and unsaturation. The resin has superior heat stability as measured by thermal gravimetric analysis and by a Brabender dynamic thermal stability test.

In a particular embodiment, this invention is a polyvinyl chloride resin prepared from vinyl chloride monomer, exclusively, that has a melting point below its degradation temperature. The degradation temperature of the resin is the temperature at which the resin discolors from white to black. Preferably, the resin melts before it discolors from white to brown, and more preferably, before it discolors from white to yellow.

In yet another aspect, this invention is a polyvinyl chloride resin prepared from vinyl chloride monomer, exclusively, that has a glass transition temperature of less than about 100° C., preferably of less than about 80° C., and a melting point of between about 190° C. and about 220° C.

In still yet another aspect, this invention is a process for improving the thermal stability of polyvinyl chloride resin. The process comprises contacting polyvinyl chloride resin with a hydrogen-substituting compound that has a selective affinity for substituting for allylic chlorines present in the resin. The compound selectively removes substantially all of the allylic and, preferably, the primary chlorine from the resin backbone as can be detected by NMR. The resin of this invention has a thermal stability at least about 5° C. higher compared to conventional free radical initiated vinyl halide resin as measured on a capillary melting point test. The resin also has a dehydrochlorination rate at processing temperatures that is 50% of the rate of conventional free radical initiated polyvinyl halide resin.

In yet another aspect, this invention is a process for selectively removing allylic chlorine from polyvinyl halide resin. As one example the process comprises contacting polyvinyl chloride resin with a hydrogen-substituting compound that has a selective affinity for substituting for the allylic chlorine. The compound selectively removes substantially all of the allylic and, preferably, the primary chlorine from the resin backbone as can be detected by NMR.

In yet another aspect, this invention is a process for preparing a rigid article from the polyvinyl halide resin of this invention. The process comprises melting a composition comprising polyvinyl halide, preferably polyvinyl chloride resin that is substantially free of allylic chlorine and allylic branching, or substantially free of allylic chlorine, free of allylic branching and free of unsaturation, and molding the molten composition to the desired shape, and cooling the composition to obtain the solid article.

Finally, this invention pertains to articles formed from the compositions of this invention.

The resins of this invention resist discoloration in thermoforming processes and are useful for making many articles. They can be used in food wrap films, medical applications such as blood bags and IV bags, wire and cable applications and the like. These thermally stable resins can be processed in hot-runner molding machines, extrusion an injection molding processes. Also, since the allylic chlorines are removed, the resins resist discolorization due to gamma-radiation sterilization compared to resins containing allylic chlorines. The process of this invention provides a flexible method for modifying the composition of polyvinyl chloride resins. Since the process selectively removes a small amount of chlorines from the polymer backbone, polyvinyl chloride resins with varying chlorine content can be prepared.

DETAILED DESCRIPTION OF THE INVENTION

Figure 1:
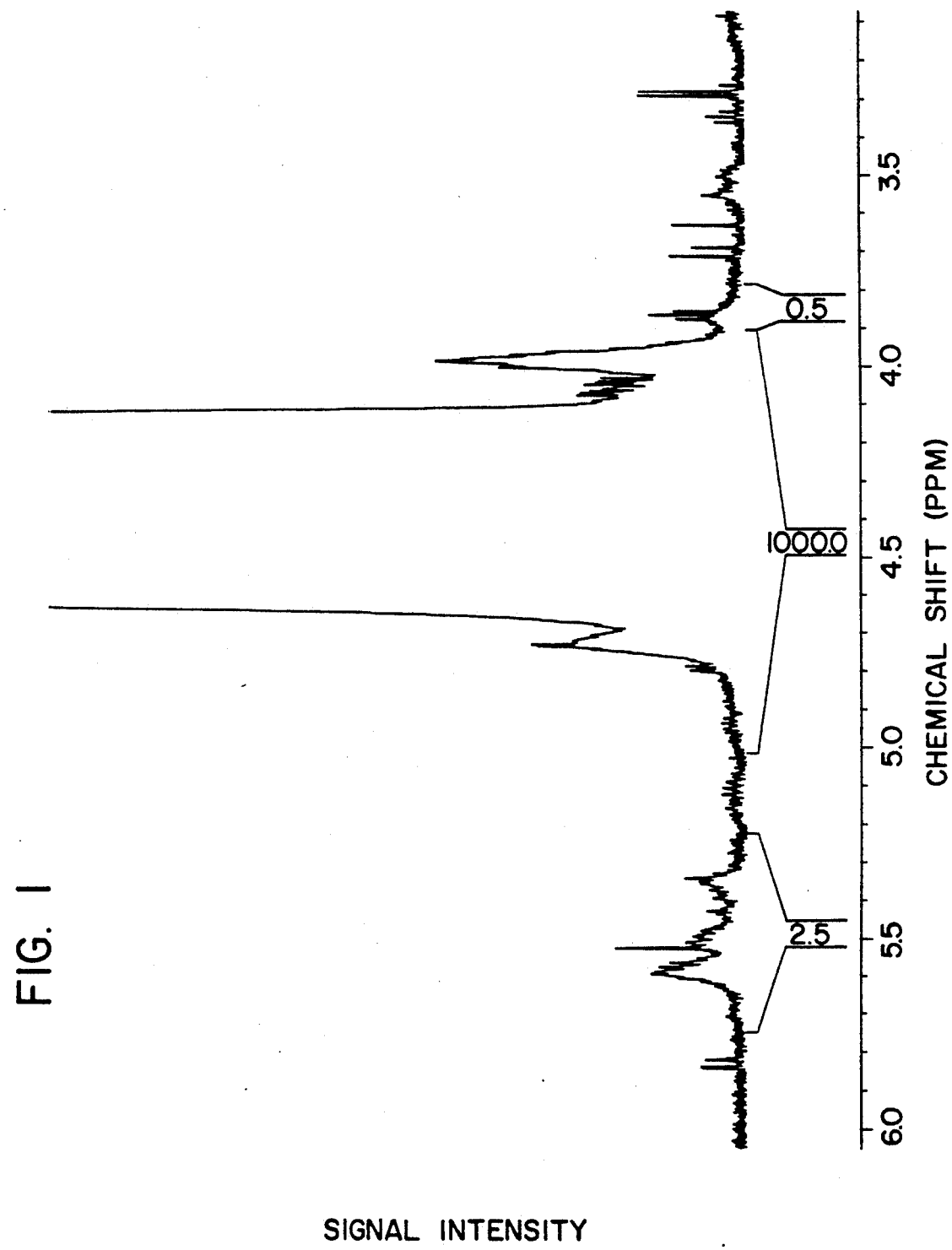
FIG. 1 is an NMR spectrum of a polyvinyl chloride resin of example 1 of this invention that is absent allylic chlorine and allylic branching.

The polyvinyl chloride resin can be prepared by any process. The typical processes include mass, suspension, and emulsion polymerization. In the free radical mass polymerization process a free radical polymerization initiator is added to a reaction mass of vinyl chloride monomer and the polymer recovered as it separates from the monomer phase. Another polymerization approach carried out in a mass process includes the use of tertiary alkyl lithium as the catalyst. U.S. Pat. No. 3,875,131 discloses such a process. The advantage of the use of tertiary alkyl lithium initiated polymerization is a reduction in the level of labile allylic chlorine in the polymer chain as compared to a resin prepared by a free radical polymerization process. In suspension and emulsion polymerization, the monomer is suspended in a liquid phase, a free radical polymerization initiator is added, and the polymer recovered as it forms. Emulsion polymerizations require the use of surfactant to provide the emulsion-size micelle particles. In a preferred process, vinyl chloride is polymerized in mass or suspension at between about 0° C. to about 60° C. in the presence of from about 5 parts to about 100 parts of tetrahydrofuran per 100 parts by weight of monomer. The resultant resin exhibits good initial thermal stability that is beneficially improved by the process of this invention.

The polyvinyl halide resins of this invention can be homopolymers of vinyl halide monomer, or copolymers of vinyl halide and a copolymerizable comonomer. The chemical properties of the vinyl halides are similar. Their degradation mechanisms are similar and the stabilization mechanisms are also similar. As used herein, the examples of this invention refer to polyvinyl chloride resin but this invention pertasins to polyvinyl chloride as well as polyvinyl fluoride. A polyvinyl halide means a polymerized resin formed from using a vinyl halide monomer such as vinyl chloride or vinyl fluoride and that has a plurality of pendant chlorine of fluorine on the polymer backbone depending on which monomer is used. The term "resin" refers to the polymer or copolymer alone without additional components such as plasticizers, stabilizers, etc. The comonomers are monomers that are copolymerizable with the vinyl group of the vinyl chloride monomer but yet are unreactive toward the hydrogen-substituting compound. These comonomers can have polymerizable ethylenically unsaturated groups. Suitable comonomers include styrene derivatives including α-methyl styrene, vinyltoluene, chlorostyrene; vinyl naphthalene; olefins and diolefins including ethylene, propylene, butadiene, isoprene, chloroprene, and the like; vinylidene halides, such as vinylidene chloride and the like; and mixtures of any of these types of monomers and other monomers copolymerizable therewith. Preferably, less than 50% by weight, and more preferably, less than 25% by weight of the comonomer is employed. Most preferably, the polyvinyl chloride resin is prepared from vinyl chloride monomer exclusively, i.e., it is a homopolymer of vinyl chloride. The polyvinyl chloride resins can have any molecular weight, but the low molecular weight resins are generally easier to process in thermoforming processes than high molecular weight resins. Also, the lower molecular weight resins dissolve more readily in solvents than higher molecular weight resins, and so can be more readily treated with the hydrogen-substituting compound. The weight average molecular weights of the resin can range from about 20,000 to about 200,000.

The polyvinyl chloride resin is contacted with a hydrogen-substituting compound that has a selective affinity for substituting for the allylic halogen. Preferably, the compound also has a selective affinity for primary halogen. By "hydrogen-substituting" is meant that the compound substitutes a hydrogen for the halogen on the polymer backbone. By "selective affinity for substituting for the allylic halogen" and "primary halogen" is meant that the compound is selective to the allylic and, preferably also, the primary halogen but not the other halogen on the polymer backbone. Therefore, the polymer is still polyvinyl halide in that it is formed from vinyl halide monomer and contains a plurality of pendant halogens in the backbone. The polyvinyl halide resins of this invention have a halogen content by weight of about 2% to 3% less than conventional polyvinyl halide resin. Hereinafter, the invention will be described in terms of a polyvinyl chloride polymer.

Suitable hydrogen-substituting compounds for use in this invention are hydride-containing compounds. Preferred compounds are organohydride compounds. The organohydride compound is comprised of a hydride portion and an organic portion. The hydride portion has the ability to substitute a hydrogen for the allylic or primary chlorine on the resin backbone. Preferably, the hydride portion contains an inorganic element that has an affinity for carbon-carbon double bonds.

The organic portion can stabilize or solubilize the hydride in an organic phase. Also, the organic portion can lower the basicity of the hydride portion and thus can result in an improvement in the selectivity of the hydride for substituting for the allylic and primary chlorines. The organic portion can be an organic solvent or an organic metal salt.

Preferably, the metals of the organic metal salts are alkaline earth and alkali metals, such as lithium, calcium, sodium, and the like, with lithium being the most preferred. Preferred organic groups of the organic metal salts are straight or branched short chain alkyl or ether groups. Specific preferred organic groups are secondary and tertiary alkyl or ether groups having from 2 to 12 carbons. Especially preferred groups are ethyl, butyl, isobutyl, tertiary butyl and the like. Preferred organic solvents are solvents that are solvents to polyvinyl chloride resin, with tetrahydrofuran being especially preferred.

Examples of suitable inorganic elements in the hydride portion are the alkaline earth metals, alkali metals, and other mono-valent inorganic elements. Preferred elements are lithium, boron and aluminum, with boron being the most preferred because its hydrides exhibit a higher degree of selectivity to the allylic and primary chlorines than the other hydrides.

The most preferred hydrogen substituting compounds are compounds containing boron and an organic metal salt. These highly preferred compounds can be called organic metal salts. Examples of these especially preferred organic borohydride salts are lithium tri-sec-butyl borohydride and lithium triethylborohydride. Borane in tetrahydrofuran is a highly preferred example of an inorganic hydride dissolved in an organic solvent. Borane in tetrahydrofuran is highly selective to allylic chlorines, while the other organic borohydride salts can also selectively remove the primary chlorines with the allylic chlorines. The most preferred organic borohydride salt is lithium triethylborohydride.

Lithium tri-tert-butoxyaluminohydride is an example of another organo hydride compound. Because it is not as selective as the preferred organic borohydride salts, a relatively small amount of the aluminohydride is employed.

The preferred organic borohydride salts can be prepared by contacting an alkaline earth metal hydride with a hydrocarbon derivative of borane. The preferred organic borohydride salts, such as lithium triethlboroxydride are commercially available, and can be obtained, for example, from Aldrich Chemical Company, Inc. Triethyl borane is available from Aldrich and Morton Thiokol, Alfa Products Division.

As an example of the preparation of the organoborohydride salts, one equivalent of triethyl borane is added to tetrahydrofuran containing an excess of lithium hydride. The mixture is stirred at 25° C. for 24 hours, and then refluxed for 2 to 3 hours. The excess lithium hydride is removed by filtering, and a clear solution is obtained. Solutions of lithium triethylborohydride in tetrahydrofuran appear stable at room temperature under an inert atmosphere.

To remove the allylic and primary chlorine from the polyvinyl chloride resin, the resin is contacted with the hydrogen-substituting compound in any manner sufficient to substitute hydrogen for the allylic chlorines. Preferably, the resin is dissolved in a suitable solvent and then contacted with the hydrogen-substituting compound in the form of a liquid. The solvent for the polyvinyl chloride resin should be nonreactive to the hydrogen-substituting compound. An amount of the solvent that is sufficient to dissolve the amount of resin is employed. Most preferably, the solvent for the resin is also a solvent for the hydrogen-substituting compound. Thus, a highly compatible mixture of solutions can be prepared. The amount of the hydrogen-substituting compound added is an amount sufficient to remove an effective number of the allylic or primary chlorines to improve the heat stability of the resin. Since the hydrogen-substituting compounds have different selectivities, this amount will vary according to the type of compound used. For example, if an organic metal salt and aluminum hydride compound is used in excess, all of the pendant chlorines, and not just the allylic and primary chlorines, can be removed. But if an organic borohydride salt, such a lithium triethylborohydride, is employed on an equal molar basis with the resin, substantially all of the allylic and primary chlorines can be selectively removed.

The resin can be treated with the hydrogen-substituting compound at any temperature and for a time sufficient to remove the allylic and, preferably, primary chlorines. Generally, the higher the temperature, the faster the reaction. However, this faster reaction can be associated with lower control and selectivity. The selectivity of the process to removal of the allylic and primary chlorines can be obtained effectively at lower temperatures. If a solvent is used to dissolve the polyvinyl chloride resin, the upper limit on the temperature, is, typically, the reflux temperature of the solvent. The process is generally run at below about 80° C., and preferably below about 25° C. The time of the treatment is a time sufficient to remove an amount of the allylic and primary chlorines to provide a resin with improved heat stability. Typically this time period ranges from about 2 to about 20, and preferably from 4 to about 12 hours.

For some types of resin, it can be advantageous to pretreat the resin with an extracting solvent prior to treatment with the hydrogen-substituting compound. This pretreatment method is highly useful for resins that are highly sensitive to heat. However, for other resins, such as resins prepared at low temperature in the presence of tetrahydrofuran, this pretreatment will be less advantageous. The extracting solvents are those that are useful in extracting impurities from polyvinyl chloride resins. A preferred solvent is methanol.

Once the treatment is completed, the polyvinyl chloride resin or hydrogen-substituting compound is recovered. In one method, an alcohol, such as methanol, is added to the mixture of resin and hydrogen-substituting compound to complex with any residual hydrogen-substituting compound. This mixture can then be added to a large amount of the alcohol to precipitate the polyvinyl chloride resin. The resin can then be recovered by filtering off the precipitate.

The polyvinyl chloride resins of this invention have improved heat stability compared to the polyvinyl chloride resin prior to treatment with the hydrogen-substituting compound. The process of this invention can be used to improve the thermal stability of any type of polyvinyl chloride resin. By "improvement" is meant that in a capillary test, the treated resins discolor at a temperature that is a least 5° C., preferably at least 10° C., more preferably at least 20° C. and most preferably at least 30° C. higher than the pretreated resin. The term "pretreated resin" refers to the resin before it is treated with the hydrogen-substituting compound. As measured by the capillary test, a sample of resin is placed in a capillary tube, heated gradually in a melting point apparatus and then the color and temperature noted. Surprisingly, at 275° C. the preferred resins of this invention have not completely turned black indicating that the resin has not completely degradated. In another method of demonstrating the improvement in the heat stability of the resin is in the measurement of the dehydrochlorination rate of the resin. The treated resins of this invention can evolve at least 20% less, preferably at least 40% and more preferably at least 50 T hydrogen chloride in mole percent over a given period of time. For the preferred resins that are polymerized at low temperatures, i.e., below 60° C., in the presence of tetrahydrofuran, the treated resins can have an induction period of about 20 minutes wherein no dehydrochlorination occurs.

The stabilized polyvinyl chloride resins of this invention are free of allylic branching, such as that would occur by the addition of an organometal heat stabilizer, or the treatment with an organometallic compound. As used in this specification, the term "allylic branching" means that the polymer is free of branch chains on the allylic carbons that exist in the backbone of the resin. The presence and types of branch groups can be determined by NMR.

As used in this specification, the term "free of allylic chlorine" means that the polymer is free of chlorines that are substituted on an allylic carbon as can be measured by NMR. "Free of primary chlorines" means that the polymer is free of chlorines that are substituted on primary carbons. The absence of these chlorines on the polymer can be demonstrated by NMR. The peaks for allylic chlorines are shown at 5.7 to 5.9 ppm in an $H^1$ (proton) NMR. As can be seen in FIG. 1, the resins of this invention do not show a peak in the 5.7 to 5.9 ppm range, and this indicates that the resin is free of allylic chlorine. The detectable limit of $H^1$ NMR is about 0.01% by weight. Thus, the resins of this invention can have allylic chlorine of up to about 0.01% by weight and still be considered to be "free of allylic chlorines." The absence of primary chlorines is shown in a shift of the peaks when an $H^1$ NMR of the pretreated resin is compared to the $H^1$ NMR of the resins of this invention.

The preferred resins of this invention have a chlorine content of from about 2% to 3% by weight less than the pretreated resin. A preferred type of resin of this invention has a glass transition temperature, Tg, of below about 100° C., and preferably below about 80° C., and more preferably ranging from about 70° C. to about 80° C. at a weight average molecular weight of between about 20,000 and 200,000, and a melting point of between about 190° C. and about 220° C. These temperatures are lower than the pretreated polyvinyl chloride resin. Therefore, the resins of this invention can be processed more readily and can be used more widely in thermoforming applications.

The resins of this invention when analyzed by thermal gravimetric analysts, show a 1% weight loss at temperatures at least about 5° C., preferably at least about 10° C. higher than the pretreated resins. When analyzed by a Brabender dynamic thermal stability test, the resins of this invention discolor to the reference degree at temperatures at least about 4° C. and preferably at least about 10° C. higher than the pretreated resin. Also, in the Brabender test, the treated resins show a viscosity increase at temperatures at least about 5° C., and preferably at least about 10° C. higher than the pretreated resin.

In regard to the melting point, pretreated polyvinyl chloride resin turns completely black before melting. Those resins need a relatively high amount of fusing agents and heat stabilizers when melt processed. Since the treated resins of this invention have a melting point, the resins can be melt processed without the addition, or with the addition of a lower amount of processing ingredients such as fusing agents, heat stabilizers and the like. Examples of melt processable applications include extruded and injection molded articles, calendared films and hot-runner molding. Specific products include wire and cable jackets, medical bags, and food wrap, and rigid or semi-rigid structural housings.

The treated resins of this invention can be used in any conventional polyvinyl chloride application and can be blended with any conventional compounding ingredients or alloying polymers. They can also be reacted with conventional polyvinyl chloride reactants. For example, the treated resins of this invention can be post-chlorinated, wherein additional chlorines are added on the backbone. By adding these additional chlorines, the Tg of the treated resin can be raised. Any of the known methods for chlorinating polyvinyl chloride can be employed. In one method, the polyvinyl chloride resin is placed in water contains chlorine. This slurry is activated with ultra violet light to add the chlorines to the resin. Thus, a chlorinated polyvinyl chloride resin with improved heat stability can be prepared.

To form the desired articles, the resins of this invention can be combined with compounding ingredients such as processing aids, lubricants, plasticizers, UV stabilizers, heat stabilizers, pigments, fillers and the like. As noted herein, however, a reduced amount of heat stabilizers can be employed.

The following examples are illustrative of the invention and do not limit its scope.

EXAMPLE 1

A commercially available polyvinyl chloride resin, Geon® 179 available from the B. F. Goodrich Company, is prepared in a dispersion polymerization process. The resin is extracted for forty-eight hours with methanol, and dried. Five gram samples of Geon 179 are added to approximately 100 ml of anhydrous tetrahydrofuran. The mixture is stirred under nitrogen and the temperature is increased to 50° C. After the resin has dissolved, the solution is cooled in an ice bath to about 7° C. One hundred milliliters of a 1.0M solution of lithium triethylborohydride in tetrahydrofuran is added dropwise from an addition funnel with stirring under nitrogen. The mixture is stirred for approximately ten hours and is allowed to warm to about 22° C. The mixture is then heated with warm water for an hour. The resulting clear and viscous mixture is then added to 500 ml of methanol with rapid stirring. A white, stringy precipitate forms and is filtered. The precipitate is blended with 500 ml of methanol and is filtered again. The fine white fibers that are obtained are dried for about ten hours under vacuum at 40° C.

The resin has a Tg inflection point of about 77.0° C. and a midpoint point of 77.2° C. The temperature at 1% weight loss under air purge is 262.82° C. Under nitrogen purge, the temperature at 1% weight loss is 252.14° C.

In a capillary test, the resin is placed in a capillary tube and gradually heated in a melting point apparatus. The color changes of the resin and the corresponding temperature are observed. The resin turns yellow at 226° C. and turns brown at 240° C. The testing apparatus has an upper limit of 275° C., and at that temperature the resin has not turned completely black. Thus, this resin has not degraded completely at 275° C. As a comparison, untreated Geon 179 resin turns yellow at 190° C., brown at 220° C., and black at 250° C.

EXAMPLE 2

A commercially available suspension polyvinyl chloride resin available from the B. F. Goodrich Company is treated with the lithium triethylborohydride solution in the same manner as is described in Example 1. Two samples of the resin, Samples 1 and 2, are compounded with a wax lubricant and a processing aid. Compound Sample 2 also contains a methyltin stabilizer. As a comparison, two compounds of non-treated resin are also prepared with the same types and amounts of compounding ingredients. The recipes of the different samples are listed in the following table:

| INGREDIENT | 1 | 2 | C1[1] | C2[1] |
| --- | --- | --- | --- | --- |
| Untreated resin | — | — | 100 | 100 |
| resin Treated with | | | | |
| Li(C$_2$H$_5$)$_3$BH | 100 | 100 | — | — |
| Processing Aid | 1.0 | 1.0 | 1.0 | 1.0 |
| Wax | 0.8 | 0.8 | 0.8 | 0.8 |
| Methyltin Stabilizer | — | 2.0 | — | 2.0 |

[1]Not an example of this invention.

The thermal stability of the samples is measured by DTS on a Brabender Extruder. The temperature is 200° C. and the extruder is run at 50 RPM. Portions of the samples are observed and the appearance and the corresponding time are noted. The results are listed in the following table:

| CHARACTERISTIC | 1 | 2 | C1[1] | C2[1] |
| --- | --- | --- | --- | --- |
| Color After 2 Minutes | Pale yellow | White | Dark Brown | White |
| Min. to Black | 14 | 24 | 4 | 20 |
| Min. to Torque + 50%[2] | >30 | >30 | 28 | 24 |

[1]Not an example of this invention.
[2]The time at which the viscosity of the sample increased to the point that the required torque to maintain 50 rpm's must be increased by 50%.

This example shows that the treated resin has substantially improved thermal stability even without additional stabilizer.

EXAMPLE 3

A polyvinyl chloride resin is prepared by the suspension process disclosed in U.S. Pat. No. 4,070,534 incorporated herein by reference as to the polymerization method. The polymerization recipe is about 870 grams of vinyl chloride, 130 grams of tetrahydrofuran (about 15 parts based on 100 parts by weight of monomer), 4 grams of polyvinyl alcohol dispersant, 2000 grams of water and 0.5 cc of secondary butyl peroxydicarbonate catalyst. A reactor is purged with nitrogen and then the vinyl chloride and THF are added. The dispersant is mixed with the water, and this mixture is added to the reactor. After adding the catalyst, the polymerization is started. The temperature of the polymerization reaction is 40° C., and the polymerization is run to a conversion of 75%. The polymer is recovered from the reactor, dried by conventional drying means and washed with methanol and then re-dried.

This resin is then treated with the lithium triethyl(borohydride) solution in the same manner as in Examples 1 and 2. The dehydrochlorination of the treated resin is measured and compared to the dehydrochlorination of the pretreated resin. The results are provided in the following table.

| Time Minutes | % Dehydrochlorination[1] | |
| --- | --- | --- |
| | 1 | C-1* |
| 0 | 0.00 | 0.00 |
| 4 | 0.00 | 0.02 |
| 8 | 0.00 | 0.06 |
| 12 | 0.00 | 0.12 |
| 16 | 0.00 | 0.18 |
| 20 | 0.00 | 0.24 |
| 24 | 0.01 | 0.30 |
| 28 | 0.02 | 0.32 |
| 32 | 0.04 | 0.38 |
| 36 | 0.06 | 0.40 |
| 40 | 0.08 | 0.42 |
| 44 | 0.10 | 0.44 |
| 48 | 0.12 | 0.47 |
| 52 | 0.14 | 0.52 |
| 56 | 0.16 | 0.57 |
| 60 | 0.18 | 0.61 |
| 64 | 0.2 | 0.65 |
| 68 | 0.22 | 0.68 |
| 72 | 0.24 | 0.72 |
| 76 | 0.26 | 0.76 |
| 80 | 0.28 | 0.79 |
| 84 | 0.30 | 0.81 |
| 88 | 0.32 | 0.84 |

*Not an example of this invention, the pretreated resin.
[1]The amount of HCl evolution at 190° C. in nitrogen.

This example shows that the treated resins have much lower dehydrochlorination rates than the pretreated resins.

EXAMPLE 4

Figure 2:
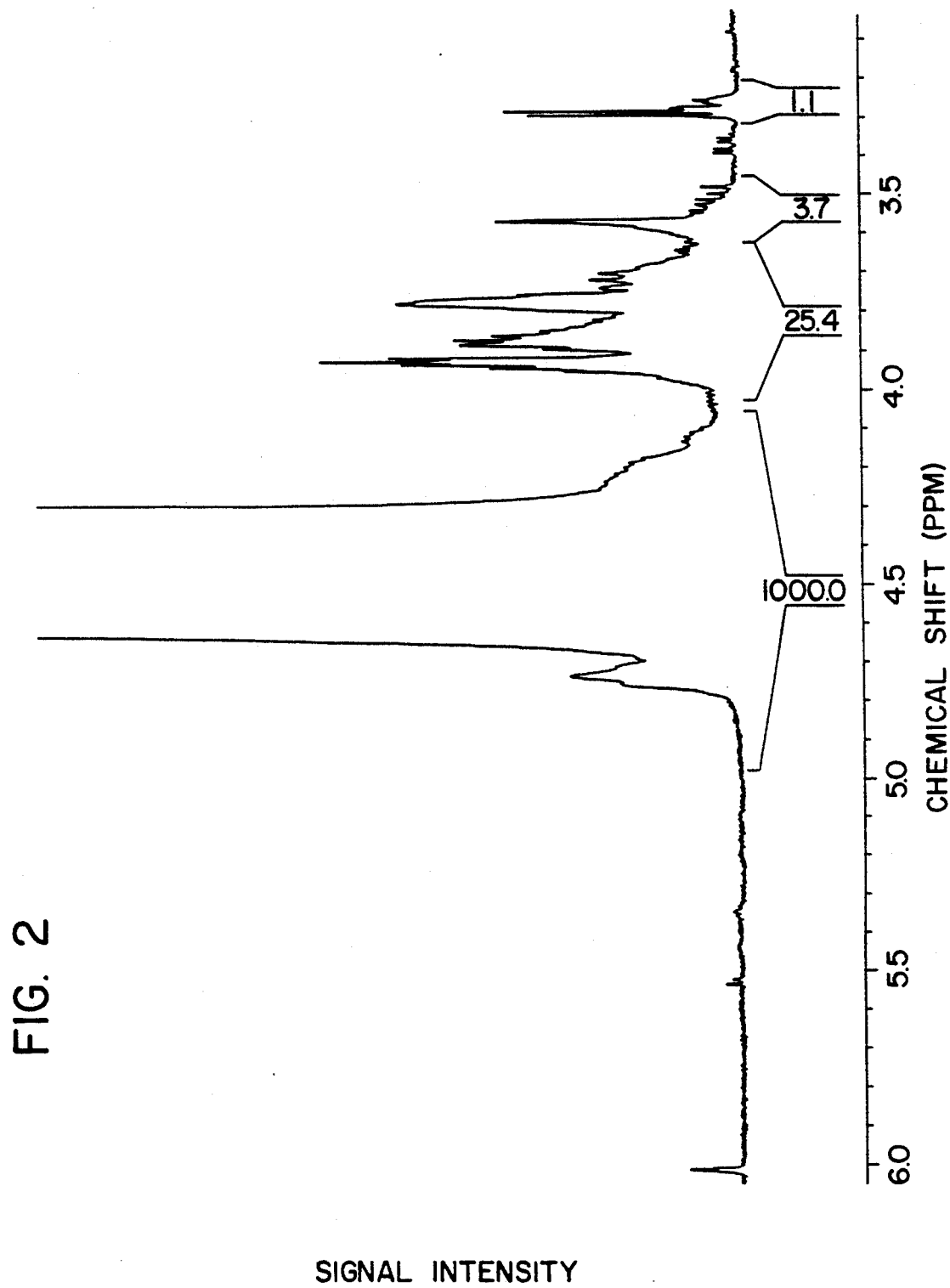
FIG. 2 is an NMR spectrum of the polyvinyl chloride resin of example 4 of this invention that is absent allylic chlorine, allylic branching and unsaturation.
Figure 3:
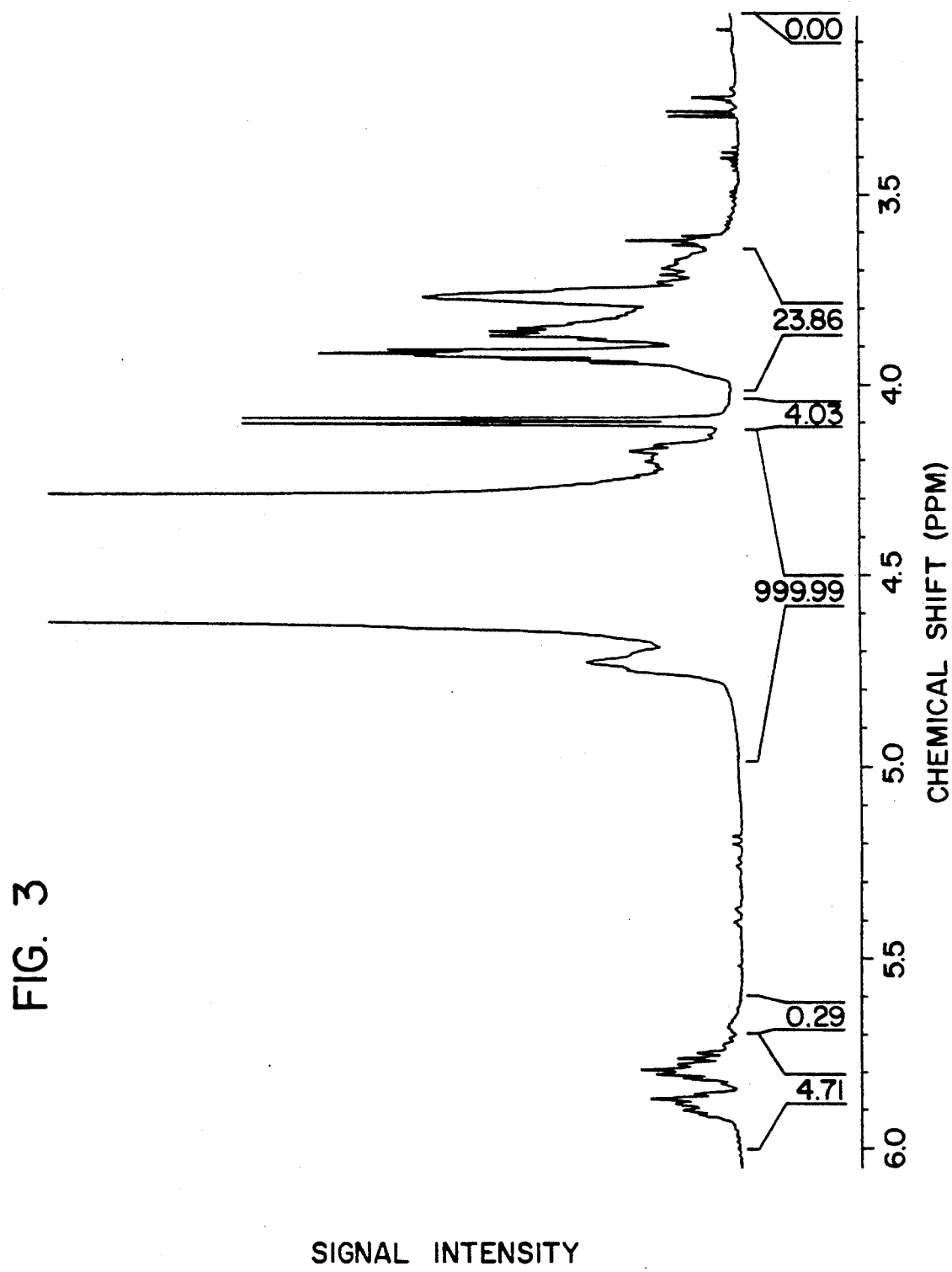
FIG. 3 is an NMR spectrum of commercially available suspension polyvinyl chloride.

A commercially available suspension polyvinyl chloride resin used in example 2 was first analyzed using $_1$H proton NMR. The resin before treatment is shown in FIG. 3 and evidences allylic chlorine and unsaturation. The resin was then treated by extracting for forty-eight hours with methanol, and dried. A five gram sample of this resin was then added to approximately 100 ml of anhydrous tetrahydrofuran. The mixture was stirred under nitrogen and the temperature is increased to 50° C. After the resin has dissolved, the solution was cooled in an ice bath to about 7° C. A quantity of borane in THF is used and the amount is based on a 20:1 molar excess of borane: allylic chlorine wherein allylic chlorine is estimated at 2 moles per thousand moles of vinyl chloride monomer. The borane/THF was added dropwise from an addition funnel with stirring under nitrogen. The mixture was stirred for approximately ten hours and is allowed to warm to about 22° C. The mixture was then heated with warm water for an hour. The resulting clear and viscous mixture was then added to 500 ml of methanol with rapid stirring. A white, stringy precipitate formed and was filtered. The precipitate was blended with 500 ml of methanol and was filtered again. The fine white fibers that are obtained are dried for about ten hours under vacuum at 40° C. The NMR spectrum of the treated resin is shown in FIG. 2. There it is seen that the allylic chlorines and unsaturation have been removed as the vinylic protons and allylic chlorines which were formerly present are now absent in the spectrum.

EXAMPLE 5

Figure 4:
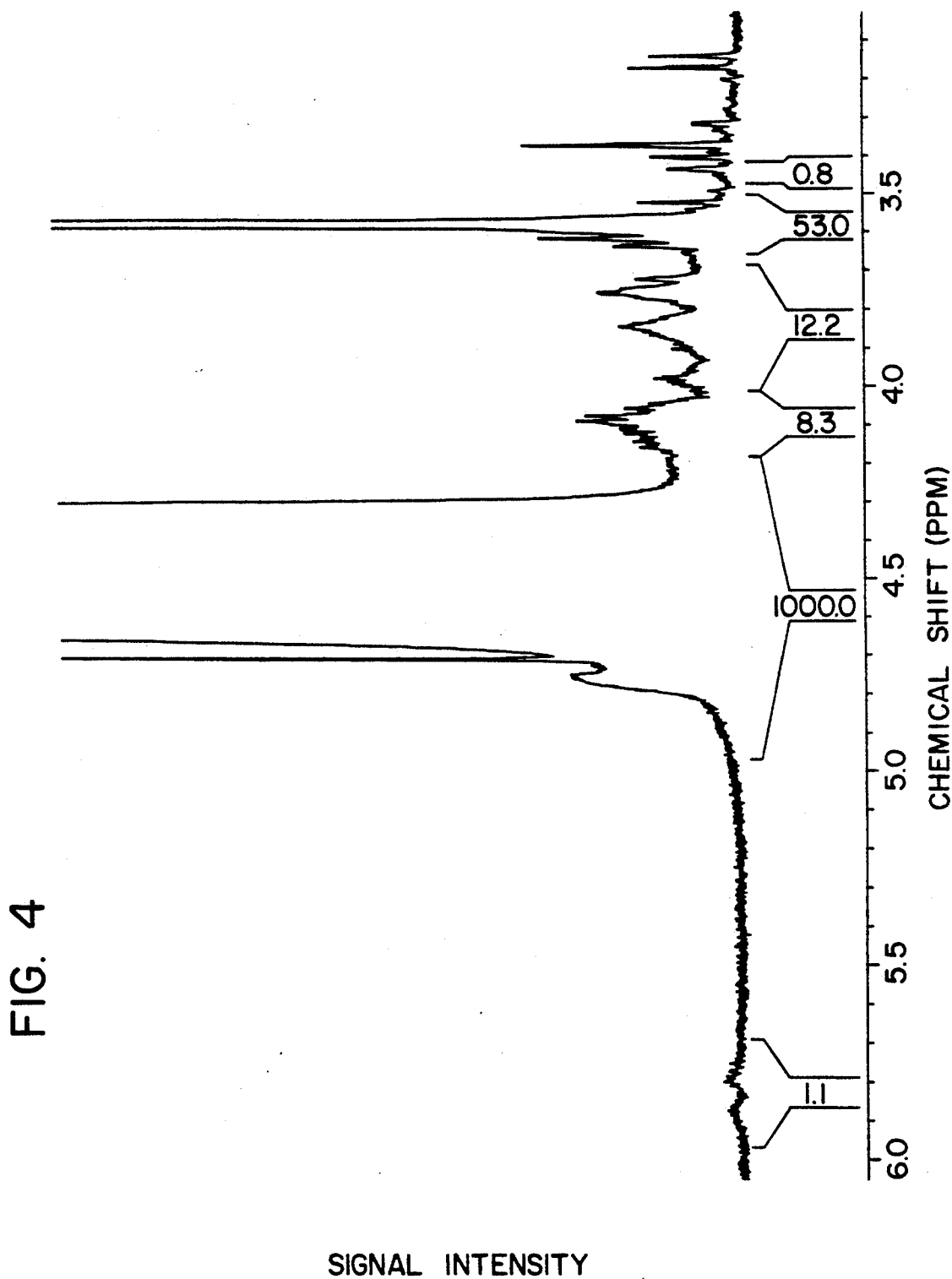
FIG. 4 is an NMR spectrum of the polyvinyl chloride resin of example 5 prepared according to U.S. Pat. No. 3,875,131 and contains allylic chlorine and unsaturation.

A PVC resin was polymerized by the method of U.S. Pat. No. 3,875,131 using tertiary butyl lithium initiator. The polymerization was conducted at 15° C. for 13 hours and the percent conversion of monomer was 64%. The total catalyst concentration in moles per mol vinyl chloride monomer was $11.58 \times 10^{-4}$. An NMR spectrum of this resin is shown in FIG. 4. There is evidence that both allylic chlorine and unsaturation are present.

DISCUSSION

As is illustrated by FIG. 4, the method disclosed in U.S. Pat. No. 3,875,131 ('131) results in the formation of lower levels of allylic chlorine and unsaturation as compared to a commercial suspension free radical polymerized PVC shown in FIG. 3, but the method of '131 does not result in the entire elimination of allylic chlorine. Moreover this method does not result in the elimination of unsaturation in the chains as is shown in FIG. 4. The absence of allylic chlorine is confirmed by the disappearance of a doublet at between 4.05 and 4.1 ppm and by the absence of vinyl protons having chemical shifts between 5.7 and 5.9 ppm. Vinylic protons in the absence of allylic chlorine have characteristic chemical shifts upfield at 5.3 to 5.6 ppm as is seen in example 1 which has the NMR spectrum of FIG. 1. Thus, this invention discloses a novel polyvinyl halide polymer which is devoid of an analytically detectable level of allylic chlorine as is illustrated by FIG. 2 and has no allylic branching.

What is claimed is:

1. A polyvinyl chloride resin containing no analytically detectable level of allylic chlorine, primary chlorine and allylic branching as measured by $H^1$ NMR analysis, wherein said resin lacks a peak at between 4.05 and 4.1 ppm and between 5.7 and 5.9 ppm, wherein said resin has a melting point distinct from its degradation temperature, and wherein said melting point ranges from about 190° C. to about 220° C.

* * * * *